US008994792B2

(12) United States Patent
Chen et al.

(10) Patent No.: US 8,994,792 B2
(45) Date of Patent: Mar. 31, 2015

(54) METHOD AND SYSTEM FOR CREATING A 3D VIDEO FROM A MONOSCOPIC 2D VIDEO AND CORRESPONDING DEPTH INFORMATION

(75) Inventors: Xuemin Chen, Rancho Santa Fe, CA (US); Nambi Seshadri, Irvine, CA (US); Jeyhan Karaoguz, Irvine, CA (US); Chris Boross, Sunnyvale, CA (US)

(73) Assignee: Broadcom Corporation, Irvine, CA (US)

( * ) Notice: Subject to any disclaimer, the term of this patent is extended or adjusted under 35 U.S.C. 154(b) by 571 days.

(21) Appl. No.: 13/077,912

(22) Filed: Mar. 31, 2011

(65) Prior Publication Data

US 2012/0050481 A1  Mar. 1, 2012

Related U.S. Application Data

(60) Provisional application No. 61/439,193, filed on Feb. 3, 2011, provisional application No. 61/439,283, filed on Feb. 3, 2011, provisional application No. 61/439,130, filed on Feb. 3, 2011, provisional (Continued)

(51) Int. Cl.
*H04N 13/02* (2006.01)
*H04N 13/00* (2006.01)
(Continued)

(52) U.S. Cl.
CPC ......... *H04N 13/026* (2013.01); *H04N 13/0066* (2013.01); *H04N 13/0271* (2013.01); *H04N 19/597* (2014.11); *H04N 19/115* (2014.11); *H04N 19/167* (2014.11); *H04N 19/33* (2014.11)
USPC .......................................................... 348/46

(58) Field of Classification Search
None
See application file for complete search history.

(56) References Cited

U.S. PATENT DOCUMENTS

| 7,531,781 B2 | 5/2009 | Sumi et al. |
| 2003/0095599 A1 | 5/2003 | Lee et al. |

(Continued)

FOREIGN PATENT DOCUMENTS

| CN | 101330631 A | 12/2008 |
| CN | 101459857 A | 6/2009 |

(Continued)

OTHER PUBLICATIONS

Comparison of Stereo Video Coding Support in MPEG-4 MAC, H.264/AVC and H.264/SVC, C.T.E.R, Herwage, et al., 6 pages.

(Continued)

*Primary Examiner* — Jorge L Ortiz Criado
*Assistant Examiner* — Kate Luo
(74) *Attorney, Agent, or Firm* — Brinks Gilson & Lione

(57) ABSTRACT

Image sensors and a depth sensor of a monoscopic video sensing device are utilized to capture a 2D video and corresponding depth information. Regions of interest (ROIs) for the captured 2D video are selected based on the captured corresponding depth information. The monoscopic video sensing device selectively processes the captured 2D video and the captured corresponding depth information based on the selected ROIs. A 3D video is composed from the processed 2D video for display. The captured depth information that is synchronized to the captured 2D video is stored as metadata, and may be interpolated to match video resolution of the captured 2D video. The captured 2D video and the captured corresponding depth information are enhanced through scalable video coding. With 3D video rendering, relevant image/video components of the captured 2D video are selected based on the selected ROIs to compose the 3D video together with the corresponding depth information.

15 Claims, 5 Drawing Sheets

Related U.S. Application Data application No. 61/439,290, filed on Feb. 3, 2011, provisional application No. 61/439,119, filed on Feb. 3, 2011, provisional application No. 61/439,297, filed on Feb. 3, 2011, provisional application No. 61/439,201, filed on Feb. 3, 2011, provisional application No. 61/439,209, filed on Feb. 3, 2011, provisional application No. 61/439,113, filed on Feb. 3, 2011, provisional application No. 61/439,103, filed on Feb. 3, 2011, provisional application No. 61/439,083, filed on Feb. 3, 2011, provisional application No. 61/439,301, filed on Feb. 3, 2011.

(51) Int. Cl.
*H04N 19/597* (2014.01)
*H04N 19/115* (2014.01)
*H04N 19/167* (2014.01)
*H04N 19/33* (2014.01)

(56) References Cited

U.S. PATENT DOCUMENTS

| | | | |
|---|---|---|---|
| 2004/0215419 A1* | 10/2004 | Havens | 702/178 |
| 2006/0017835 A1* | 1/2006 | Jacobsen | 348/345 |
| 2009/0226079 A1* | 9/2009 | Katz et al. | 382/154 |
| 2009/0268014 A1* | 10/2009 | Holliman | 348/46 |
| 2009/0290811 A1* | 11/2009 | Imai | 382/285 |
| 2009/0317061 A1* | 12/2009 | Jung et al. | 386/95 |
| 2009/0324062 A1 | 12/2009 | Lim et al. | |
| 2010/0080448 A1* | 4/2010 | Tam et al. | 382/154 |
| 2010/0183070 A1* | 7/2010 | Lu et al. | 375/240.08 |
| 2010/0215257 A1* | 8/2010 | Dariush et al. | 382/159 |

FOREIGN PATENT DOCUMENTS

| | | |
|---|---|---|
| CN | 101651772 A | 2/2010 |
| CN | 101771892 A | 7/2010 |
| CN | 101883291 A | 11/2010 |
| JP | 2006-238093 | 9/2006 |
| KR | 10-2010-0000671 | 1/2010 |
| WO | WO 2010/043773 A1 | 4/2010 |

OTHER PUBLICATIONS

Real time Hand Gesture Recognition using a Range Camera, Zhi Li, et al., ACRA, Dec. 2-4, 2009, 7 pages.
Korean Office Action Dated Apr. 24, 2013.
European Search Report for Serial No. 12000328.0, Dated Jul. 25, 2013.
Chai D. et al., "Foreground/Background Bit Allocation for Region-Of-Interest Coding," Imaging Processing, 2000. Proceedings. 2000 International Conference on Sep. 10-13, 2000. IEEE, Piscataway, NJ, Sep. 10, 2000, pp. 923-926 vol. 2.
Lim I. et al., "P-12: Depth Super-Resolution for Enhanced Free-Viewpoint TV," Digest of Technical Papers—SID International Symposium, May 2010 Society for Information Display, vol. 41 1, May 2010, pp. 1268-1271.

* cited by examiner

METHOD AND SYSTEM FOR CREATING A 3D VIDEO FROM A MONOSCOPIC 2D VIDEO AND CORRESPONDING DEPTH INFORMATION

CROSS-REFERENCE TO RELATED APPLICATIONS/INCORPORATION BY REFERENCE

This patent application makes reference to, claims priority to, and claims benefit from U.S. Provisional Application Ser. No. 61/377,867, which was filed on Aug. 27, 2010.

This patent application makes reference to, claims priority to, and claims benefit from U.S. Provisional Application Ser. No. 61/439,274, which was filed on Feb. 3, 2011.

This application also makes reference to:
U.S. Patent Application Ser. No. 61/439,193 filed on Feb. 3, 2011;
U.S. patent application Ser. No. 13/077,900 filed on Mar. 31, 2011;
U.S. Patent Application Ser. No. 61/439,283 filed on Feb. 3, 2011;
U.S. patent application Ser. No. 13/077,922 filed on Mar. 31, 2011;
U.S. Patent Application Ser. No. 61/439,130 filed on Feb. 3, 2011;
U.S. patent application Ser. No. 13/077,886 filed on Mar. 31, 2011;
U.S. Patent Application Ser. No. 61/439,290 filed on Feb. 3, 2011;
U.S. patent application Ser. No. 13/077,926 filed on Mar. 31, 2011;
U.S. Patent Application Ser. No. 61/439,119 filed on Feb. 3, 2011;
U.S. patent application Ser. No. 13/077.893 filed on Mar. 31, 2011;
U.S. Patent Application Ser. No. 61/439,297 filed on Feb. 3, 2011;
U.S. patent application Ser. No. 13/077,923 filed on Mar. 31, 2011;
U.S. Patent Application Ser. No. 61/439,201 filed on Feb. 3, 2011;
U.S. Patent Application Ser. No. 61/439,209 filed on Feb. 3, 2011;
U.S. Patent Application Ser. No. 61/439,113 filed on Feb. 3, 2011;
U.S. patent application Ser. No. 13/077,868 filed on Mar. 31, 2011;
U.S. Patent Application Ser. No. 61/439,103 filed on Feb. 3, 2011;
U.S. patent application Ser. No. 13/077,880 filed on Mar. 31, 2011;
U.S. Patent Application Ser. No. 61/439,083 filed on Feb. 3, 2011;
U.S. patent application Ser. No. 13/077,899 filed on Mar. 31, 2011;
U.S. Patent Application Ser. No. 61/439,301 filed on Feb. 3, 2011; and
U.S. patent application Ser. No. 13/077,930 filed on Mar. 31, 2011.

Each of the above stated applications is hereby incorporated herein by reference in its entirety.

FIELD OF THE INVENTION

Certain embodiments of the invention relate to video processing. More specifically, certain embodiments of the invention relate to a method and system for creating a 3D video from a monoscopic 2D video and corresponding depth information.

BACKGROUND OF THE INVENTION

Digital video capabilities may be incorporated into a wide range of devices such as, for example, digital televisions, digital direct broadcast systems, digital recording devices, and the like. Digital video devices may provide significant improvements over conventional analog video systems in processing and transmitting video sequences with increased bandwidth efficiency.

Video content may be recorded in two-dimensional (2D) format or in three-dimensional (3D) format. In various applications such as, for example, the DVD movies and the digital TV, a 3D video is often desirable because it is often more realistic to viewers than the 2D counterpart. A 3D video comprises a left view video and a right view video. A 3D video frame may be produced by combining left view video components and right view video components, respectively.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for creating a 3D video from a monoscopic 2D video and corresponding depth information, substantially as illustrated by and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for creating a 3D video from a monoscopic 2D video and corresponding depth information. In various embodiments of the invention, one or more image sensors of a monoscopic sensing device such as a monoscopic video camera may capture a two-dimensional (2D) video. A depth sensor of the monoscopic video camera may capture corresponding depth information for the captured 2D video. The monoscopic video camera may be operable to select one or more regions of interest (ROIs) for the captured 2D video based on the captured corresponding depth information. The captured 2D video and the captured corresponding depth information may be selectively processed based on the selected ROIs. For example, the monoscopic video camera may dedicate or allocate more bits and/or memory to the selected ROIs, than to those regions of lesser interest. The monoscopic video camera may compose a 3D video from the captured 2D video for display. The captured corresponding depth information may be synchronized to the captured 2D video. The synchronized depth information may be stored as metadata for the captured 2D video. The monoscopic video camera may interpolate the stored depth information between pixels and/or between frames to match video resolution of the captured 2D video. The captured 2D video and the captured corresponding depth information may be enhanced through scalable coding that may be performed selectively based on the selected ROIs. With 3D video rendering, relevant image/video components within the captured 2D video may be selected based on the selected ROIs. The monoscopic video camera may utilize the selected image/video components and the corresponding depth information to compose a 3D video for 3D video rendering and/or playback.

Figure 1:
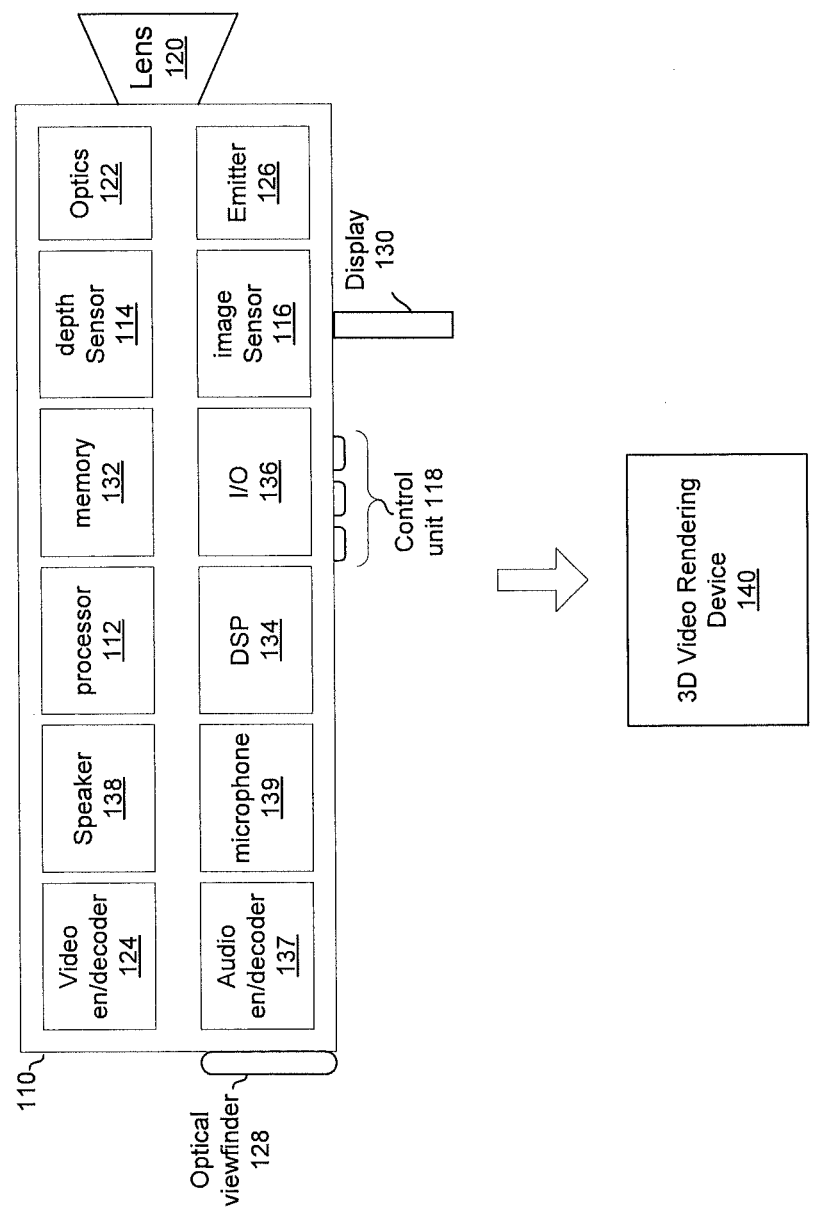
FIG. 1 is a diagram illustrating an exemplary video communication system that is operable to create a three-dimensional (3D) video from a monoscopic two-dimensional (2D) video and corresponding depth information, in accordance with an embodiment of the invention.

FIG. 1 is a diagram illustrating an exemplary video communication system that is operable to create a three-dimensional (3D) video from a monoscopic two-dimensional (2D) video and corresponding depth information, in accordance with an embodiment of the invention. Referring to FIG. 1, there is shown a video communication system 100. The video communication system 100 comprises a monoscopic video camera 110 and a 3D video rendering device 140.

The monoscopic video camera 110 may comprise a processor 112, a depth sensor 114, one or more image sensors 116, a control unit 118, a lens 120, optics 122, a video en/decoder 124, an emitter 126, an optical viewfinder 128, a display 130, a memory 132, a digital signal processor (DSP) 134, an input/output module 136, an audio en/decoder 137, a speaker 138, and/or a microphone 139.

The processor 112 may comprise suitable logic, circuitry, interfaces, and/or code that may be operable to manage and/or handle operations of various device components such as, for example, the depth sensor 114, the image sensors 116, and/or the control unit 118. The processor 112 may be operable to utilize the image sensors 116 to capture a 2D video via a single viewpoint corresponding to the lens 120. The processor 112 may utilize the one or more image sensors 116 to collect luminance and/or chrominance information. The processor 112 may also utilize the depth sensor 114 to capture depth information for the captured 2D video. The processor 112 may perform various video processing such as, for example, video compression/decompression via the video en/decoder 124, on the captured 2D video. The resulting processed video may be present or display to a user via the optical viewfinder 126 and/or the display 128.

The depth sensor 114 may comprise suitable logic, circuitry, interfaces, and/or code that may be operable to detect electromagnetic (EM) waves in the infrared spectrum. The depth sensor 114 may determine or sense depth information of objects based on corresponding infrared EM waves. For example, the depth sensor 114 may determine or capture depth information for the objects based on time-of-flight of infrared EM waves transmitted by the emitter 126 and reflected from the objects back to the depth sensor 114.

The image sensor(s) 116 may each comprise suitable logic, circuitry, interfaces, and/or code that may be operable to sense optical signals focused by the lens 120. The image sensor(s) 116 may convert the optical signals to electrical signals to capture luminance and/or chrominance information. Each image sensor 116 may comprise, for example, a charge coupled device (CCD) image sensor or a complimentary metal oxide semiconductor (CMOS) image sensor.

The control unit 118 may comprise suitable logic, circuitry, interfaces, and/or code that may enable a user to interact with the monoscopic video camera 110. For example, the control unit 118 may manage or control video recording and/or playback.

The lens 120 is an optical component that may be utilized to capture or sense EM waves. The captured EM waves may be sufficiently focused through the optics 122 on the image sensor(s) 116 to form or generate 2D images for the scene in front of the lens 120.

The optics 122 may comprise optical devices for conditioning and directing EM waves received via the lens 120. The optics 122 may direct EM waves in the visible spectrum to the image sensor(s) 116 and direct EM waves in the infrared spectrum to the depth sensor 114, respectively. The optics 122 may comprise, for example, one or more lenses, prisms, luminance and/or color filters, and/or mirrors.

The video en/decoder 124 may comprise suitable logic, circuitry, interfaces, and/or code that may be operable to perform video compression and/or decompression. The video en/decoder 124 may utilize various video compression and/or decompression algorithms such as video coding algorithms specified in MPEG-2, and/or other video formats for video coding.

The emitter 126 may comprise suitable logic, circuitry, interfaces, and/or code that may be operable to produce and/or transmit electromagnetic waves in infrared spectrum, for example.

The optical viewfinder 128 may comprise suitable logic, circuitry, interfaces, and/or code that may be operable to present or display what the lens 120 projects to a user. In other words, the optical viewfinder 128 may enable a user to see what the lens 120 "sees," that is, what is "in frame".

The display 130 may comprise suitable logic, circuitry, interfaces, and/or code that may be operable to display images/video to a user. The display 130 may comprise a liquid crystal display (LCD), a light emitting diode (LED) display and/or other display technologies on which images/video captured via the monoscopic video camera 110 may be displayed to the user.

The memory 132 may comprise suitable logic, circuitry, interfaces and/or code that may be operable to store information such as executable instructions and data that may be utilized by the monoscopic video camera 110. The executable instructions may comprise various video compression/decompression algorithms that may be for video coding via the video en/decoder 124. The data may comprise captured images/video and/or coded video. The memory 132 may comprise RAM, ROM, low latency nonvolatile memory such as flash memory and/or other suitable electronic data storage.

The digital signal processor (DSP) 134 may comprise suitable logic, circuitry, interfaces, and/or code that may be operable to perform signal processing of captured image data, captured depth information, and/or captured audio data.

The input/output (I/O) module 136 may comprise suitable logic, circuitry, interfaces, and/or code that may enable the monoscopic video camera 110 to interface with other devices in accordance with one or more standards such as USB, PCI-X, IEEE 1394, HDMI, DisplayPort, and/or analog audio and/or analog video standards. For example, the I/O module 136 may be operable to send and receive signals from the control unit 118, output video to the display 130, output audio, from the audio en/decoder 137, to the speaker 138, handle audio input from the microphone 139, read from and write to cassettes, flash cards, or other external memory attached to the monoscopic video camera 110, and/or output audio and/or video externally via one or more ports such as a IEEE 1394 port, a HDMI and/or an USB port for transmission and/or rendering.

The audio en/decoder 137 may comprise suitable logic, circuitry, interfaces, and/or code that may be operable to perform audio coding. The audio en/decoder 137 may be operable to utilize various audio compression/decompression algorithms such as audio compression/decompression algorithms specified in MPEG-2, and/or other audio formats for audio coding.

The 3D video rendering device 140 may comprise suitable logic, circuitry, interfaces, and/or code that may be operable to render images/video captured by the monoscopic video camera 110. The 3D video rendering device 140 may be coupled to the monoscopic video camera 110 internally or externally. The 3D video rendering device 140 may be adapted to render 3D video output from the monoscopic video camera 110.

Although the monoscopic video camera 110 is illustrated in FIG. 1 to support the creation of a 3D video from a monoscopic 2D video and corresponding depth information, the invention is not so limited. In this regard, a monoscopic video sensing device, which comprises one or more image sensors and one or more depth sensors, may be utilized to create a 3D video from a monoscopic 2D video and corresponding depth information without departing from the spirit and scope of the various embodiments of the invention. An image sensor may comprise one or more light emitters and/or one or more light receivers.

In an exemplary operation, the monoscopic video camera 110 may be operable to capture a 2D video via a single viewpoint from the lens 120. Depth information corresponding to the captured 2D video may be captured and/or collected via the depth sensor 114.

In an exemplary embodiment of the invention, the retrieved depth information may be synchronized or correlated to the luminance and/or color information of the captured 2D video to form or produce depth images. The depth images may be stored into the memory 132 as metadata for the captured 2D video. The stored depth images may provide additional layer of information that may be utilized by the monoscopic video camera 110 for video rendering and/or playback.

In an exemplary embodiment of the invention, the resolution of the depth images for the captured 2D video may be adapted or adjusted to match the resolution of corresponding images in the captured 2D video. In this regard, the monoscopic video camera 110 may perform image interpolation on the depth images to provide depth information for each pixel, or group of pixels, of the luminance and/or color information. For example, in instances where the resolution of the depth sensor 114 is less than the resolution of the image sensor 116, the monoscopic video camera 110 may be operable to interpolate depth information between pixels for the captured 2D video to generate or provide depth information for each pixel, or group of pixels, of the luminance and/or color information. In instances where the frame rate of the depth sensor 114 is less than the frame rate of the image sensory 116, the monoscopic video camera 110 may be operable to interpolate depth information between frames for the captured 2D video to generate or provide depth information for each frame of the luminance and/or color information.

In an exemplary embodiment of the invention, the monoscopic video camera 110 may operate in either a 2D mode or a 3D mode. In a 2D mode, the monoscopic video camera 110 may present or display the captured 2D video to a user via the optical viewfinder 128 and/or the display 130. In a 3D mode, the monoscopic video camera 110 may form or compose a 3D video from the captured 2D video and the corresponding depth images for display. In this regard, the composed 3D video may be in a format suitable for the optical viewfinder 128 and/or the display 130.

In an exemplary embodiment of the invention, the captured 2D video and the corresponding depth images may be applied as a base layer video and an enhancement layer video, respectively. In this regard, regions of interest (ROIs) for the captured 2D video (the base layer video) may be identified or selected based on corresponding depth information within the enhancement layer video. Image/video components and corresponding depth information within the selected depth-based ROIs may be enhanced through scalable video coding. (SVC). The monoscopic video camera 110 may be operable to selectively compress image/video components of the captured 2D video and corresponding depth information based on the selected depth-based ROIs. For example, more bits and/or memory resources may be dedicated or allocated to the selected depth-based ROIs, than to those regions of lesser interest. The monoscopic video camera 110 may progressively allocate or dedicate less bits and/or memory to regions that are of lesser interest.

In an exemplary embodiment of the invention, the monoscopic video camera 110 may be operable to compose a 3D video from the captured 2D video and corresponding depth information based on the selected depth-based ROIs. For example, the selected depth-based ROIs may provide information about the range of depth information behind and in front of the picture, respectively. In this regard, the range of depth information may indicate how relevant of image/video components in the captured 2D video to the 3D video. In other words, the depth information from the selected depth-based ROIs may be utilized to map or correlate the image/video components of the captured 2D video to various regions of the 3D video. The related image/video components of the captured 2D video together with corresponding depth information may be assembled appropriately to form or compose the 3D video for display.

Figure 2:
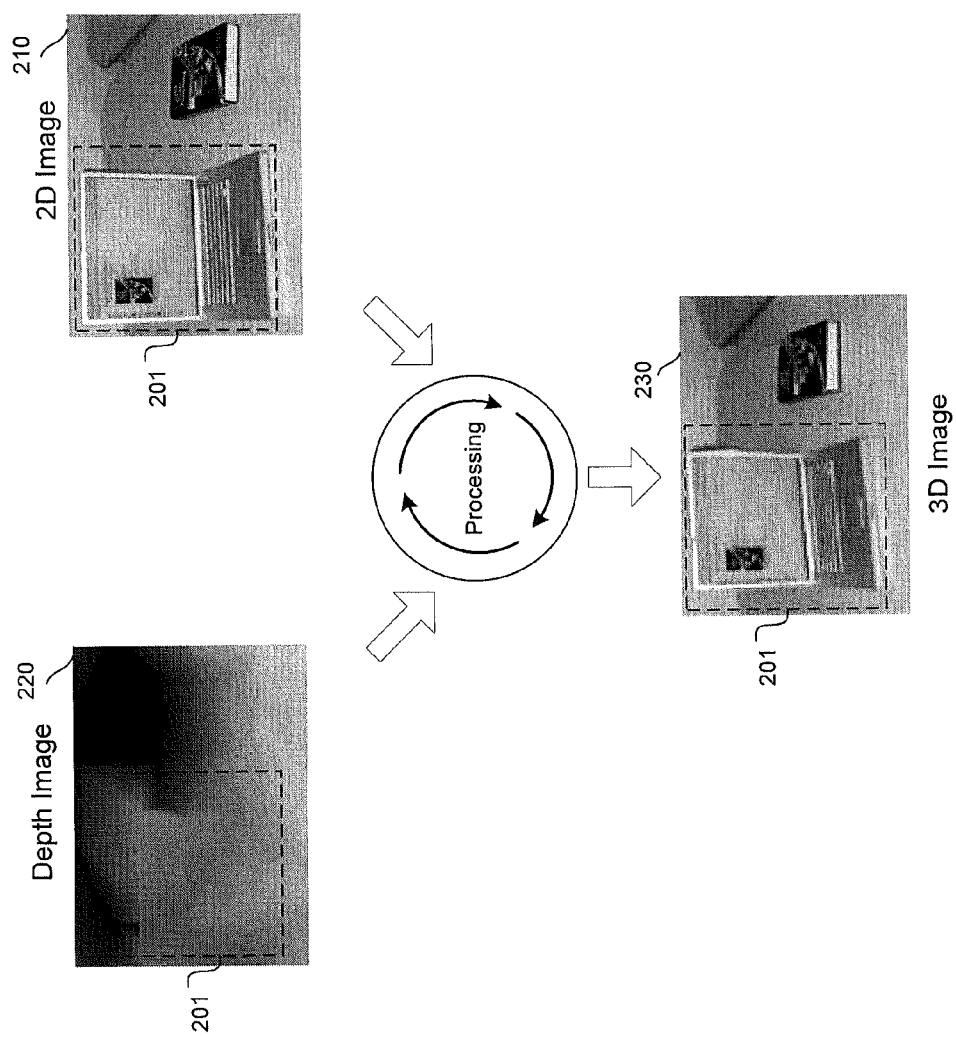
FIG. 2 illustrates processing of a monoscopic 2D video and corresponding depth information to generate a 3D video, in accordance with an embodiment of the invention.

FIG. 2 illustrates processing of a monoscopic 2D video and corresponding depth information to generate a 3D video, in accordance with an embodiment of the invention. Referring to FIG. 2, there is shown a 2D image 210, a depth image 220 and a 3D image 230. The 2D image 210 may comprise luminance and/or color information. The depth image 220 may comprise depth information corresponding to the luminance and/or color information of the 2D image 210. Within the depth image 220, darker regions represent that the object is far away from the user and lighter regions indicate that the object is closer to the user.

In various embodiments of the invention, depth information in the depth image 220 may be correlated with or synchronized to the luminance and/or color information of the 2D image 210. The depth image 220 may be stored as metadata for the 2D image 210. The resolution of the depth image 220 may be adjusted or adapted to match the resolution of the 2D image 210 when needed. A ROI 201 may be selected based on depth information within the depth image 220. The resulting depth-based ROI 201 may be utilized to selectively process the 2D image 210 and the depth image 220. For example, more bits may be allocated or utilized to enhance information within the depth-based ROI 201 for both the 2D image 210 and the depth image 220. The 3D image 230 may be formed or composed from the 2D image 210 and the depth image 220. The depth-based ROI 201 may indicate information about the range of depth information that may be utilized to compose and/or render the 3D image 230.

Figure 3:
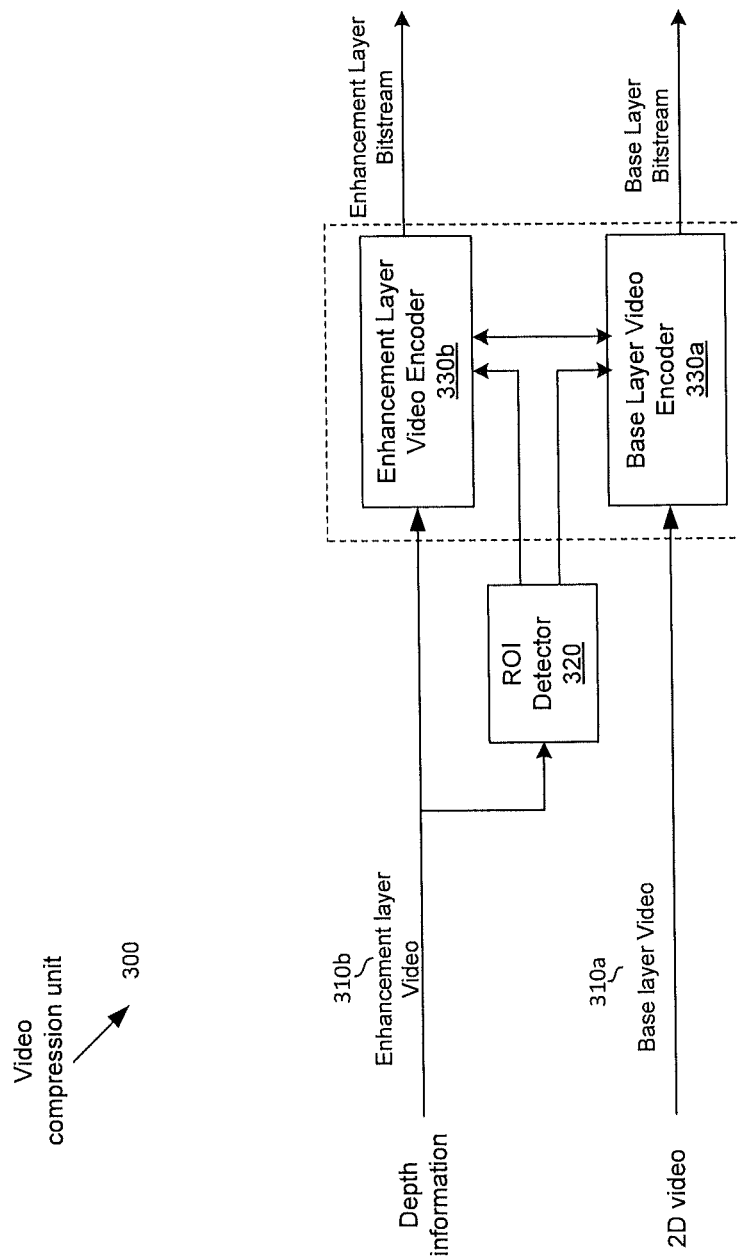
FIG. 3 is a block diagram that illustrates scalable video coding of a monoscopic 2D video and corresponding depth information, in accordance with an embodiment of the invention.

FIG. 3 is a block diagram that illustrates scalable video coding of a monoscopic 2D video and corresponding depth information, in accordance with an embodiment of the invention. Referring to FIG. 3, there is shown a video compression unit 300 comprising a ROI detector 320, a base layer video encoder 330*a* and an enhancement layer video encoder 330*b*.

The video compression unit 300 may comprise suitable logic, circuitry, interfaces, and/or code that may be operable to concurrently encode a captured 2D and captured corresponding depth information. The video compression unit 200 may encode the captured 2D video as a base layer video 310*a* and encode the captured corresponding depth information as an enhancement layer video 310*b*, respectively.

The ROI detector 320 may comprise suitable logic, circuitry, interfaces, and/or code that may be operable to detect or select one or more ROIs based on depth information of the enhancement layer video 310*b*. Information on the selected ROIs may be communicated to the base layer video encoder 330*a* and the enhancement layer video encoder 330*b*, respectively.

The base layer video encoder 330*a* may comprise suitable logic, circuitry, interfaces and/or code that may be operable to encode the captured 2D video frame by frame. The base layer video encoder 330*a* may selectively compress the captured 2D video based on the selected ROIs. In this regard, the base layer video encoder 330*a* may dedicate or allocate more processing resources such as bits and/or memory to compress information within the selected depth-based ROIs. Depending on application, the base layer video encoder 330*a* may progressively allocate less bits and/or memory to regions that are of lesser interest. The base layer video encoder 330*a* may be operable to utilize various video compression algorithms such as specified in MPEG-2, MPEG-4, AVC, VC1, VP6, and/or other video formats to form compressed or coded video contents for the captured 2D video. Information such as the scene information from base view coding may be communicated with the enhancement layer video encoder 330*b* to be used for enhancement layer video coding. The base layer video encoder 330*a* may output or provide a base layer bitstream for transmission when needed.

The enhancement layer video encoder 330*b* may comprise suitable logic, circuitry, interfaces and/or code that may be operable to encode the captured corresponding depth information for the captured 2D video frame by frame. The enhancement layer video encoder 330*b* may selectively compress the captured corresponding depth information based on the selected ROIs. In this regard, the enhancement layer video encoder 330*b* may allocate more bits and/or memory to compress depth information within the selected depth-based ROIs. Depending on application, the enhancement layer video encoder 330*b* may progressively allocate less bits and/or memory to regions that are of lesser interest. The enhancement layer video encoder 330*b* may be operable to utilize various video compression algorithms such as specified in MPEG-2, MPEG-4, AVC, VC1, VP6, and/or other video formats to form compressed or coded video contents of the depth information for the captured 2D video. The enhancement layer video encoder 330*b* may output or provide an enhancement layer bitstream for transmission when needed.

Although in FIG. 3, a single base layer video encoder 330*a* and a single enhancement layer video encoder 330*b* are illustrated for processing a captured 2D video and captured corresponding depth information for the captured 2D video, respectively, the invention may not be so limited. Accordingly, any number of enhancement view video encoders may be used for processing the captured 2D video in addition to the base layer video encoder 330*a* without departing from the spirit and scope of various embodiments of the invention.

In an exemplary operation, the monoscopic video camera 110 may be operable to capture a 2D video and corresponding depth information. The captured 2D video and the captured corresponding depth information may be concurrently processed as the base layer video 310*a* and the enhancement layer video 310*b*, respectively. One or more ROIs may be selected for the captured 2D video based on the captured corresponding depth information. The base layer video encoder 330*a* and the enhancement layer video encoder 330*b* may selectively perform video compression on the captured 2D video and the captured corresponding depth information, respectively, based on the selected ROIs. In this regard, more processing resources such as bits, power and/or memory may be allocated and/or dedicated to process information within the selected ROIs. The base layer video encoder 330*a* and the enhancement layer video encoder 330*b* may progressively allocate less processing resources to code information within regions that are of lesser interest. The resulting base layer bitstream and enhancement layer bitstream may be combined for transmission when needed.

Figure 4:
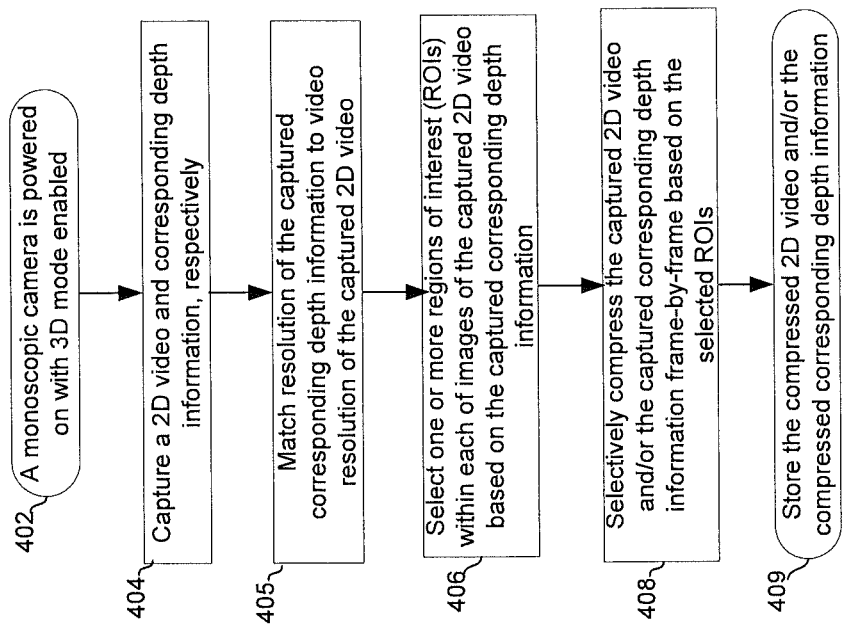
FIG. 4 is a flow chart illustrating exemplary steps that may be performed by a monoscopic camcorder to selectively compress a 2D video and corresponding depth information, in accordance with an embodiment of the invention.

FIG. 4 is a flow chart illustrating exemplary steps that may be performed by a monoscopic camcorder to selectively compress a 2D video and corresponding depth information, in accordance with an embodiment of the invention. Referring to FIG. 4, the exemplary steps may begin with step 402, in which the monoscopic video camera 110 is powered on with 3D mode enabled. In step 404, the monoscopic video camera 110 may utilize the image sensors 116 to capture a 2D video and utilize the depth sensor 114 to capture corresponding depth information for the captured 2D video. In step 405, the monoscopic video camera 110 may be operable to match resolution of the captured depth information to video resolution of the captured 2D video. For example, the monoscopic video camera 110 may interpolate the captured depth information between pixels and/or between frames to provide depth information for each pixel, or group of pixels, within the captured 2D video. In step 406, the monoscopic video camera 110 may be operable to select one or more ROIs within each of images for the captured 2D video based on the corresponding depth information. In step 408, the monoscopic video camera 110 may be operable to selectively compress the captured 2D video and the captured corresponding depth information frame-by-frame based on the selected ROIs. In this regard, the monoscopic video camera 110 may allocate processing resources such as bits, power and/or memory to compress information within each image or frame based on the selected ROIs. More bits, power and/or memory may be allocated to the selected ROIs than to those regions of lesser interest. In addition, processing resources allocated to the regions of lesser interests may be progressively reduced to save power. In step 409, the compressed 2D video and the compressed corresponding depth information may be stored into the memory 132 for transmission when needed.

Figure 5:
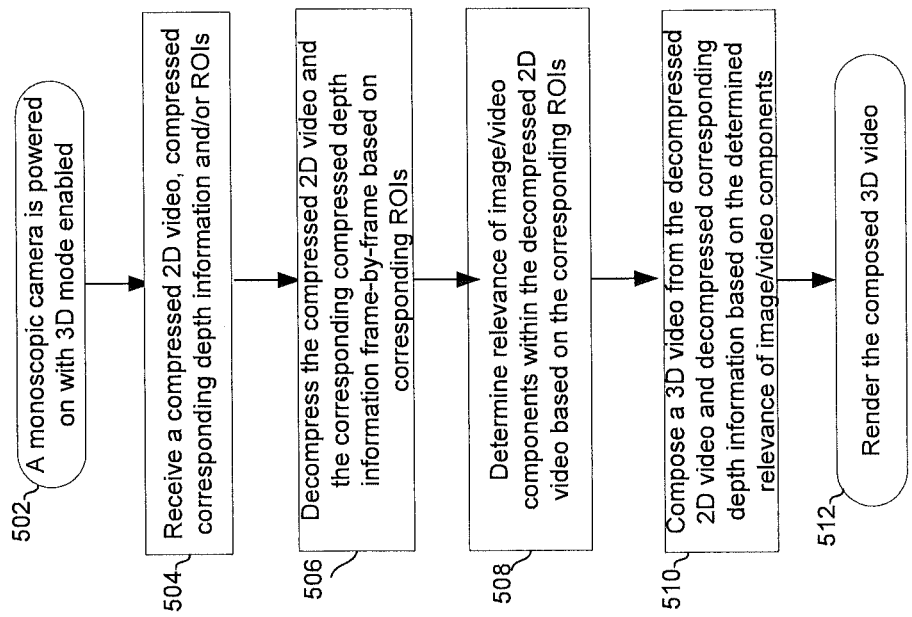
FIG. 5 is a flow chart illustrating exemplary steps that may be performed by a monoscopic camcorder to compose a 3D video from a 2D video and corresponding depth information for 3D video rendering, in accordance with an embodiment of the invention.

FIG. 5 is a flow chart illustrating exemplary steps that may be performed by a monoscopic camcorder to compose a 3D video from a 2D video and corresponding depth information for 3D video rendering, in accordance with an embodiment of the invention. Referring to FIG. 5, the exemplary steps may begin with step 502, in which the monoscopic video camera 110 is powered on with 3D mode enabled. In step 504, the processor 112 of the monoscopic video camera 110 may receive a compressed 2D video, compressed corresponding depth information and/or ROIs.

In step 506, the monoscopic video camera 110 may be operable to decompress, via the video en/decoder 124, the compressed 2D video and the compressed corresponding depth information frame-by-frame based on the ROIs. In step 508, the monoscopic video camera 110 may identify or determine relevance of image/video components in the decompressed 2D video based on the ROIs. For example, the depth information within the ROIs may indicate the selection of image/video components of the decompressed 2D video for 3D video rendering. In step 510, the selected image/video components together with the corresponding depth information may be utilized to compose a 3D video for display. In step 512, the monoscopic video camera 110 may communicate the composed 3D video to the 3D video rendering device 140 for 3D video rendering.

Various aspects of a method and system for creating a 3D video from a monoscopic 2D video and corresponding depth information are provided. In various exemplary embodiments of the invention, a monoscopic video sensing device such as the monoscopic video camera 110 is operable to utilize the image sensors 116 to capture a 2D video. The monoscopic video camera 110 may utilize the depth sensor 114 to capture corresponding depth information for the captured 2D video. One or more ROIs may be selected or identified for the captured 2D video based on the captured corresponding depth information. The monoscopic video camera 110 may selectively process the captured 2D video and the captured corresponding depth information based on the selected ROIs. For example, more bits or memory may be allocated to process information within the selected ROIs. Depending on applications, the monoscopic video camera 110 may be operable to compose or create a 3D video from the captured 2D video and the captured corresponding depth information for display. In this regard, the monoscopic video camera 110 may synchronize the captured corresponding depth information to the captured 2D video. The synchronized corresponding depth information may be stored into the memory 132 as metadata for the captured 2D video.

The stored depth information may provide additional layer of information for video rendering and/or playback. A resolution of the stored depth information may be adjusted or adapted to match video resolution of the captured 2D video so as to provide depth information for each pixel, or group of pixels, within the captured 2D video. The captured 2D video and the captured corresponding depth information may be enhanced through scalable video coding. In this regard, the captured 2D video and the captured corresponding depth information may be encoded into a base layer video and an enhancement layer video, respectively. The captured 2D video and the captured corresponding depth information may be selectively compressed, via the base layer video encoder 330a and via the enhancement layer video encoder 330b, respectively, based on the selected ROIs. In some instances, 3D video rendering is desired for the captured 2D video. In this regard, the monoscopic video camera 110 may decompress the compressed 2D video and the compressed corresponding depth information via the video en/decoder 124. The relevance of image/video components within the resulting decompressed 2D video may be determined or identified based on, for example, the range of depth information indicated by the selected ROIs. The monoscopic video camera 110 may be operable to assemble the identified relevant image/video components to compose or create the 3D video from the decompressed 2D video and the decompressed corresponding depth information. The resulting composed 3D video may be rendered via the 3D video rendering device 140.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for creating a 3D video from a monoscopic 2D video and corresponding depth information.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method, comprising:
capturing a video via one or more image sensors of a monoscopic video sensing device;
capturing corresponding depth information for said captured video via a depth sensor of said monoscopic video sensing device;
synchronizing said captured corresponding depth information to said captured video;
selecting one or more regions of interest in said captured video; and
composing a modified video from said captured video and said captured corresponding depth information, wherein said composing comprises scalable video coding, which compresses said captured video and said captured depth information into a base layer video and an enhancement layer video respectively wherein, depth information corresponding to said one or more regions of interest is allocated more bits for compression than rest of said depth information.

2. The method according to claim 1, comprising storing said synchronized depth information as metadata for said captured video.

3. The method according to claim 2, comprising matching resolution of said stored depth information to video resolution of said captured video.

4. The method according to claim 3, comprising decompressing said compressed video and said compressed depth information; and determining relevance of video components within said decompressed video based on said one or more regions of interest.

5. The method according to claim 1, further comprising mapping the captured video to the modified video based on depth information contained in the one or more regions of interest.

6. The method according to claim 1, wherein said captured video is a two-dimensional video and the modified video is a three-dimensional video based on said captured two-dimensional video and said corresponding captured depth information.

7. A system for processing signals, the system comprising:
one or more processors and/or circuits for use in a monoscopic video sensing device, said one or more processors and/or circuits comprising one or more image sensors and a depth sensor, wherein said one or more processors and/or circuits are operable to:
capture a video via said one or more image sensors;
capture depth information for said captured video via said depth sensor;
synchronize said captured depth information to said captured video;
select one or more regions of interest in said captured video and/or said captured depth information;
identify video and depth information corresponding to said regions of interest;
process said captured video and said captured depth information selectively based on said one or more regions of interest, said process comprising encoding of said captured video and depth information, wherein said regions of interest are encoded at a lower compression ratio than rest of said captured video and depth information, and wherein, said captured video and said stored depth information are encoded into a base layer video and an enhancement layer video, respectively; and
compose an enhanced video from said processed video and said processed depth information.

8. The system according to claim 7, wherein said one or more circuits are operable to store said synchronized depth information as metadata for said captured video.

9. The system according to claim 8, wherein said one or more circuits are operable to match resolution of said stored depth information to video resolution of said captured video.

10. The system according to claim 8, wherein said one or more circuits are operable to:
decompress said compressed video and said compressed depth information; and
determine relevance of video components within said decompressed video based on said one or more regions of interest.

11. The system according to claim 7, wherein the one or more image sensors comprise a two-dimensional image sensor and the depth sensor comprises a one-dimensional depth sensor.

12. The system according to claim 7, wherein the processing of said captured video and said captured depth information further comprises allocation of more processing resources to process captured video and depth information in said one or more regions of interest than to process rest of said captured video and depth information.

13. The system according to claim 7, wherein said captured video is a two-dimensional video and the composed enhanced video is a three-dimensional video based on said processed two-dimensional video and said processed depth information.

14. A device for processing video signals, said device comprising:
one or more circuits for capturing video, said one or circuits comprising an image sensor and a depth sensor, wherein said one or more circuits are operable to:
capture depth information via said depth sensor;
capture a video via said image sensor;
synchronize said captured depth information and said captured video;
select a depth-based region of interest in said captured depth information;
determine a region of video corresponding to said depth-based region of interest; and
selectively encode said video based on said depth-based region of interest wherein said region of video corresponding to said depth-based region of interest is allocated more bits than rest of said video, wherein said captured video is encoded in a base video layer and said depth information is encoded in an enhancement video layer.

15. The device according to claim 14, wherein said one or more circuits are operable to:
generate an enhanced video based on said captured video and said depth information;
map said selected depth-based region of interest in said captured video to said generated video; and
selectively encode said generated video based on said mapped depth-based regions of interest, wherein information of said depth-based region of interest is allocated more bits than a region of non-interest.

* * * * *

UNITED STATES PATENT AND TRADEMARK OFFICE
CERTIFICATE OF CORRECTION

PATENT NO. : 8,994,792 B2  Page 1 of 1
APPLICATION NO. : 13/077912
DATED : March 31, 2015
INVENTOR(S) : Xuemin Chen et al.

It is certified that error appears in the above-identified patent and that said Letters Patent is hereby corrected as shown below:

On the Title Page

(60) Related U.S. Application Data

Before "Provisional application No. 61/439,193" insert --Provisional Application No. 61/377,867, filed on Aug. 27, 2010, Provisional Application No. 61/439,274, filed on Feb. 03, 2011.--

Signed and Sealed this
Eighteenth Day of August, 2015

Michelle K. Lee
*Director of the United States Patent and Trademark Office*